(12) United States Patent
Warner et al.

(10) Patent No.: US 7,981,356 B2
(45) Date of Patent: Jul. 19, 2011

(54) STRETCH BLOW MOULDING METHOD AND APPARATUS

(75) Inventors: Graeme Warner, Stapylton Queensland (AU); John Warner, Stapylton Queensland (AU)

(73) Assignee: Invoplas Pty Ltd, Stapylton Queensland (AU)

( * ) Notice: Subject to any disclaimer, the term of this patent is extended or adjusted under 35 U.S.C. 154(b) by 414 days.

(21) Appl. No.: 11/886,366

(22) PCT Filed: Mar. 15, 2006

(86) PCT No.: PCT/AU2006/000339
§ 371 (c)(1),
(2), (4) Date: Mar. 31, 2009

(87) PCT Pub. No.: WO2006/096916
PCT Pub. Date: Sep. 21, 2006

(65) Prior Publication Data
US 2011/0031659 A1  Feb. 10, 2011

(30) Foreign Application Priority Data
Mar. 15, 2005  (AU) ............... 2005901251

(51) Int. Cl.
*B29C 49/66*  (2006.01)
(52) U.S. Cl. ......... 264/528; 264/523; 264/524; 264/532
(58) Field of Classification Search .............. None
See application file for complete search history.

(56) References Cited

U.S. PATENT DOCUMENTS

| | | | | |
|---|---|---|---|---|
| 4,217,328 A | * | 8/1980 | Cambio, Jr. ............ | 264/504 |
| 4,473,515 A | * | 9/1984 | Ryder ..................... | 264/28 |
| 4,512,948 A | * | 4/1985 | Jabarin ................... | 264/521 |
| 4,707,966 A | * | 11/1987 | Weiler et al. ............. | 53/410 |
| 4,716,622 A | | 1/1988 | DeBruyn et al. | |
| 5,008,977 A | | 4/1991 | Lautenschlager et al. | |
| 5,085,822 A | * | 2/1992 | Uehara et al. .......... | 264/528 |
| 5,290,506 A | * | 3/1994 | Yokobayashi ........... | 264/520 |
| 6,287,508 B1 | | 9/2001 | Stripe | |

(Continued)

FOREIGN PATENT DOCUMENTS
DE   36 01 682   7/1987
(Continued)

OTHER PUBLICATIONS
Chinese Office Action with English Translation, Apr. 26, 2010.

*Primary Examiner* — Monica A Huson
(74) *Attorney, Agent, or Firm* — Howard & Howard Attorneys PLLC (57) ABSTRACT

A method and apparatus for stretch blow moulding a preform into a desired article is disclosed. The method includes the steps of inserting the preform into a hollow mould, stretching the heated preform with a stretching member, filling the preform with an incompressible fluid such that the preform expands and is formed into the article by the mould and draining the incompressible fluid from the interior of the formed article. The apparatus comprises a hollow mould for receiving the preform, a stretching member for stretching the preform, an incompressible fluid filling means for filling the preform with an incompressible fluid such that the preform expands and a drain for draining the incompressible fluid from the formed article.

19 Claims, 4 Drawing Sheets

U.S. PATENT DOCUMENTS

| | | | |
|---|---|---|---|
| 6,393,663 B1 | 5/2002 | Lin | |
| 6,579,489 B1 | 6/2003 | Thomas | |
| 6,767,197 B2 * | 7/2004 | Boyd et al. | 425/143 |
| 7,473,388 B2 * | 1/2009 | Desanaux et al. | 264/524 |
| 2006/0097417 A1 | 5/2006 | Emmer | |
| 2010/0225031 A1 * | 9/2010 | Andison et al. | 264/525 |

FOREIGN PATENT DOCUMENTS

| | | |
|---|---|---|
| DE | 93 06 820.4 | 10/1993 |
| DE | 198 03 909 A1 | 8/1999 |
| EP | 0 028 450 A2 | 5/1981 |
| EP | 0 987 394 | 3/2000 |
| FR | 2 839 277 A1 | 11/2003 |
| FR | 2 848 906 A1 | 6/2004 |
| WO | 97/25165 A1 | 7/1997 |
| WO | 01/19594 A1 | 3/2001 |
| WO | 01/62479 A1 | 8/2001 |
| WO | 2004/065105 A1 | 8/2004 |
| WO | 2006/096916 A1 | 9/2006 |

\* cited by examiner

STRETCH BLOW MOULDING METHOD AND APPARATUS

FIELD OF INVENTION

The present invention relates generally to the manufacture of plastic articles and, in particular, to the manufacture of plastic articles by stretch blow moulding.

BACKGROUND OF THE INVENTION

Polyethylene terephthalate (PET) containers are normally produced by means of stretch blow moulding employing a hollow injection moulded preform.

The preform normally has a diameter which is less than the diameter of the container which is to be produced from the preform, an axial length which is less than the axial length of the container, and an opening which has the same dimensions and shape as the opening of the container.

The container is stretch blow moulded from the preform by firstly heating the preform to a temperature which will allow the preform to be moulded into the shape of the container. The heated preform is then positioned inside a mould having an interior shape corresponding to the exterior shape of the container which is to be moulded from the preform.

In conventional stretch blow moulding the pressure of the air inside the preform is increased to a "blowing pressure", which is normally between 20 and 50 bar, so that the preform is expanded to such an extent that the exterior surfaces thereof press against the interior surface of the mould and thereby adopt the shape of the interior surface of the mould. Once the expanded preform has cooled sufficiently, the preform remains in the shape of the container without requiring the presence of the air at the blowing pressure.

The blowing pressure is normally generated by a pump in combination with a pressure vessel for storing the compressed air which is output by the pump. The pump and the pressure vessel must comply with certain regulations. Complying with these regulations usually involves a considerable investment of time and money.

FR 2839277 discloses a method of stretch blow moulding for producing a polyester resin container from a heated preform in which an incompressible fluid is injected in to the preform. In the process of FR 2839277 the injection of incompressible fluid simultaneously stretches and inflates the preform until it reaches the walls of the mold. The method of FR 2839277 is particularly suited to a single stage combined molding-filling embodiment for the production of small containers such as PET drink bottles.

Other stretch blow moulding methods use a compressible fluid, such as a gas, in combination with a stretching rod. In these methods the stretching rod is introduced axially into the mould and into the interior of the preform through the opening thereof, to stretch the heated preform inside the mould.

The stretch blow moulding processes described above are particularly suitable for the manufacture of relatively small plastic containers having volumes of up to approximately 20 liters and wall thickness of approximately 0.3 millimetres. However, for containers and articles having larger volumes and for wall thicknesses, the processes are uneconomic and unreliable as they are unable to reliably produce uniformly expanded containers and articles of about 20 liters volume or greater.

OBJECT OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying illustrations, wherein, by way of illustration and example, a preferred embodiment of the present invention is disclosed.

SUMMARY OF THE INVENTION

According to a first form of the present invention there is provided a method for moulding a substantially hollow plastic article from a substantially hollow heated plastic preform, the method including the steps of:

inserting the heated preform into a substantially hollow mould;

stretching the heated preform with a stretching member;

substantially filling the stretched heated preform with an incompressible fluid such that the stretched heated preform expands and is formed into the shape of the article by the mould; and draining the incompressible fluid from the interior of the article formed by expanding the stretched heated preform inside the mould.

According to a second form of the present invention there is provided a method for moulding a substantially hollow plastic article from a substantially hollow plastic preform, the method including the steps of:

inserting the preform into a substantially hollow mould;

heating the preform;

stretching the heated preform with a stretching member;

substantially filling the stretched heated preform with an incompressible fluid such that the stretched heated preform expands and is formed into the shape of the article by the mould; and draining the incompressible fluid from the interior of the article formed by expanding the stretched heated preform inside the mould.

In one aspect, draining in the first and second forms of the invention includes substantially filling the article with a gas which may displace the incompressible fluid and may assist cooling the article. Preferably the gas is air.

According to a third form of the present invention there is provided an apparatus for moulding a substantially hollow plastic article from a substantially hollow plastic preform, the apparatus comprising:

a substantially hollow mould for receiving the preform;

a stretching member for stretching the preform after heating of the preform;

an incompressible fluid filling means for substantially filling the stretched heated preform with an incompressible fluid such that the preform expands; and a drain for draining the incompressible fluid from the interior of the article formed by expanding the preform inside the mould.

In one aspect, the apparatus of the third form of the invention further comprises a heater for heating the preform.

In another aspect the apparatus of the third form of the invention further comprises a gas filling means for substantially filling the expanded stretched heated preform with a gas. The filling of the container with gas may force the incompressible fluid out the interior of the article through the drain.

By employing a stretching rod and an incompressible fluid rather than a gas as the blowing agent, advantageously the above forms of the invention are able to more reliably and therefore more economically produce plastic articles having relatively large volumes and wall thicknesses.

The above forms of the invention may be used to mould any suitable article of any suitable size and shape. For example, the above forms of the invention may be used to mould a container. In a particularly preferred aspect, the apparatus is suitable for moulding a container which is substantially symmetrical and/or simple in shape with an opening in one of the ends. The container may be a tank such as a water tank.

Although the above forms of the invention are particularly suitable for manufacturing articles which have volumes and wall thicknesses which respectively exceed 20 liters and 0.3 millimetres, the above forms of the invention may nevertheless be used to manufacture containers of volume 20 liters or less and having wall thickness 0.3 millimetres or less.

The above forms of the invention may be used to mould an article from a preform which is made from any suitable plastic. Preferably, the above forms of the invention are able to be used to mould an article from a preform which is substantially made from a thermoplastic. Preferably, the above forms of the invention are able to be used to mould an article from a preform which is made from PET.

The heater which is used to heat the preform may be of any suitable type. Preferably, the heater is able to be operated to heat the preform to any temperature which will allow the preform to be moulded into the shape of the article. In a more preferred aspect, the heater is able to be operated to heat the preform to the stretching temperature of the plastic from which the preform is made. If the preform is made from PET, the heater is preferably operated to heat the preform to the stretching temperature of PET which is typically in the range of about 85° C. to 130° C. More preferably the heater is operated to heat the preform to about 105° C.

The preform may be comprised of any plastic and preferably is a thermoplastic such as a polyvinyl chloride, a styrene, an acrylic or a polyolefin. Preferably the preform is comprised of PET.

Preferably, the preform is heated before insertion into the mould. In an alternative aspect, the heater may be adapted to heat the preform after or while the preform is inserted into the mould.

The mould may be of any suitable type. In a preferred aspect, the mould is substantially symmetrical and/or simple in shape with an opening in one of the ends. The mould may be a one piece mould or may be a split mould.

After the preform is inserted into the mould, a sealing member is preferably used to cover an opening of the preform. The stretching member preferably extends through the sealing member and into the preform. An incompressible fluid line preferably extends through the sealing member so that the incompressible fluid used to fill the preform passes through the incompressible fluid line when the preform is being filled or when the incompressible fluid is being drained from the container.

The incompressible fluid which is used to fill the preform may be of any suitable type. The heated preform is preferably filled with a liquid. In a preferred aspect the heated preform is filled with water.

The pressure of the incompressible fluid inside the preform may be increased to any pressure which causes the preform to expand. That pressure, which is referred to as the blowing pressure of the incompressible fluid, may be varied to suit the type of plastic which the preform is made from. If the preform is made from PET, the blowing pressure which is required to expand the preform will typically be between about 3 to 40 Bar. Preferably the blowing pressure is about 20 bar.

The temperature of the incompressible fluid inside the preform may be regulated to any temperature. Preferably the temperature is between about 85° C. and 130° C. and more preferably the temperature is about 95° C.

During draining of the incompressible fluid the pressure thereof is preferably decreased to be typically between about 3 and 40 bar and preferably to be about 6 bar.

The preform may be filled with incompressible fluid in any suitable manner. For example in the first and second forms of the invention the incompressible fluid may be injected or pumped into the preform. The incompressible fluid filling means used in the third form of the invention may be of any suitable type. In a preferred aspect, the incompressible fluid filling means is a pump which is able to pump incompressible fluid into the preform such that the pressure of the incompressible fluid in the preform increases to the required blowing pressure. The pump may, for example, be in the form of a hydraulic cylinder which is able to inject the incompressible fluid into the preform.

Preferably, in the above forms of the invention the heated preform is stretched either before or at the same time as the preform is filled with incompressible fluid. In a particularly preferred aspect, the stretching member is inserted into the preform through an opening in the preform.

The drain which is used to drain the incompressible fluid from the interior of the article which is formed by expanding the preform inside the mould may be of any suitable type. In a preferred aspect, the drain is in the incompressible fluid line.

The gas employed to expel the incompressible fluid out of the article may cool the article and set it in final shape.

The pressure of the gas introduced into the article will typically be between about 3 and 40 bar and will preferably be about 7 bar.

Preferably the gas is introduced at a temperature of between about 5° C. and 85° C. and more preferably at about 25° C.

Throughout this specification, unless otherwise indicated, "comprise", "comprises" and "comprising" are used inclusively rather than exclusively, so that a stated integer or group of integers may include one or more other non-stated integers or groups of integers.

Additionally, throughout the specification and claims, unless the context requires otherwise, the term "substantially" or "about" will be understood to not be limited to the value for the range qualified by the terms.

BRIEF DESCRIPTION OF THE DRAWINGS

Non-limiting embodiments of the invention are described herein with reference to drawings wherein.

DETAILED DESCRIPTION OF THE PREFERRED EMBODIMENTS

Although the invention will be described with particular reference to the manufacture of containers from PET plastic, it will be appreciated that this is by way of example only and that the invention may be used to manufacture not only containers but other types of articles from PET and other types of plastic, for example a polyvinyl chloride, a styrene, an acrylic or a polyolefin. Examples of articles that may be manufactured according to the invention include buckets, drums, pails, tubs, road barriers, canoes, pool filter housings, portable toilet enclosures, other enclosures and tanks, such as water tanks, as well as liners and dividers for such articles. According to the present invention any large substantially hollow article may be manufactured.

Reference will now be made in detail to the embodiments of the present invention, examples of which are illustrated in the accompanying drawings, wherein like reference numerals refer to the like elements throughout. The following description is based on illustrated embodiments of the invention and should not be taken as limiting the invention with regard to alternative embodiments that are not explicitly described herein.

Figure 1:
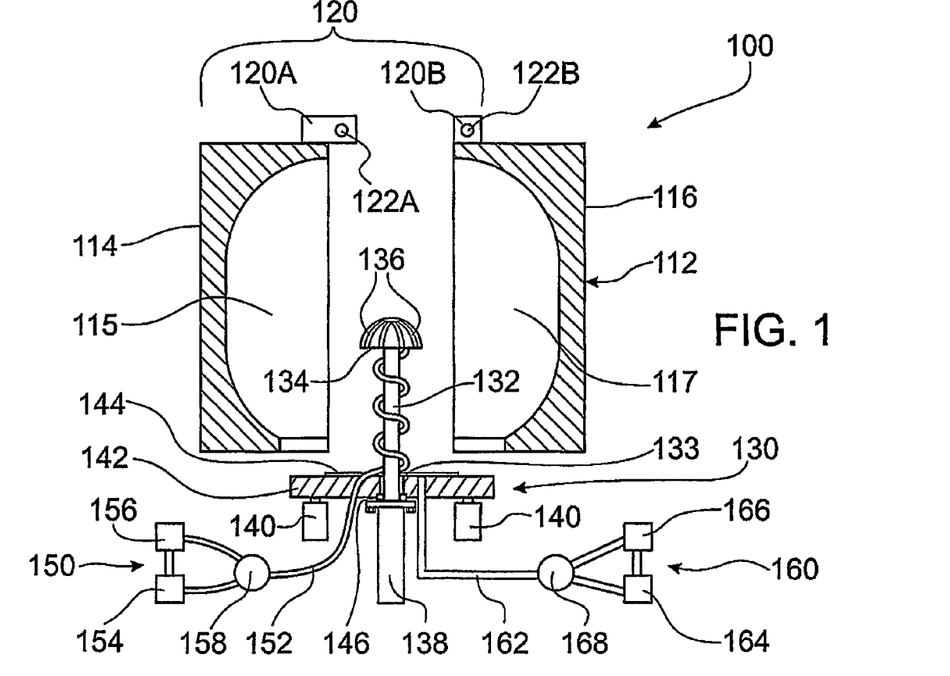
FIG. 1 is a schematic depiction of a stretch blow moulding apparatus of the invention.

Referring to FIG. 1, which illustrates one embodiment of the invention, stretch blow moulding apparatus 100 includes a substantially hollow mould 112 comprising a first mould half 114 and a second mold half 116. Each mould half 114, 116 has a respective cavity, first cavity 115 and second cavity 117. The two mould halves 114, 116 are shown in FIG. 1 in a disengaged state from which they are movable to an engaged state.

Apparatus 100 includes a lock 120 which in FIG. 1 is shown to include a male component 120A and a female component 120B each of which include an orifice 122A and 122B, respectively. In FIG. 1 the lock 120 is shown in an unlocked state. Locking device 120 is movable between the unlocked state and a locked state. In the locked state male orifice 122A and female orifice 122B are aligned and, for example, a pin (not shown), is inserted therethrough. In the locked state lock 120 securely holds the two mould halves 114 and 116 together. A person of skill in the art is readily able to select a suitable lock 120.

Apparatus 100 also includes a blow core assembly 130 which includes a stretching member 132 in the form of a rod. Stretching member 132 includes a mushroom head 134 on which is disposed a plurality of gas channels 136. The stretching member 132 is shown in FIG. 1 in a retracted position, as will be described below the stretching member 132 is movable between the retracted position and an extended position.

Additionally, the blow core assembly 130 includes a central hydraulic ram 138, two peripheral hydraulic rams 140 and sealing member 142. As will be described below the central hydraulic ram 138 functions to move the stretching member 132 between the retracted position and the extended position while the peripheral hydraulic rams 140 function to move sealing member 142 between an engaged position with the mold 112 and the disengaged position shown in FIG. 1.

Sealing member 142, in the form of a sealing plate, includes first seal 144 and second seal 146. Sealing member 142 additionally includes a gap 133 through which stretching member 132 passes.

The blow core assembly 130 also includes a gas filling means 150 and an incompressible fluid filling means 160.

The gas filling means 150 includes a gas line 152 which connects a gas supply 154, a gas compressor 156 and a gas valve 158. FIG. 1 also shows the gas supply 154 is directly connected to gas compressor 156 via gas line 152. The gas line 152 extends through sealing member 142 and is connected to the mushroom head 134 such that gas in gas line 152 may be expelled from the plurality of gas channels 136.

The incompressible fluid filling means 160 includes an incompressible fluid line 162 which connects an incompressible fluid tank 164, an incompressible fluid pump 166 and an incompressible fluid valve 168. FIG. 1 also shows the incompressible fluid tank 164 is directly connected to incompressible fluid pump 166 via incompressible fluid line 162.

Figure 2:
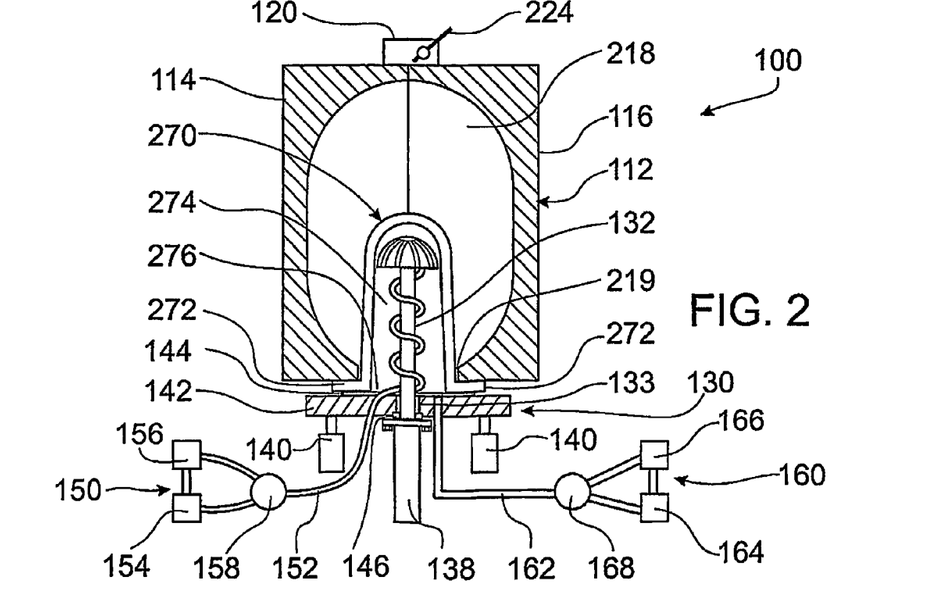
FIG. 2 provides a schematic depiction of a stretch blow moulding apparatus of the invention in which a preform is positioned for moulding.

FIG. 2 shows the apparatus 100 in which a preform 270 is positioned ready to be stretch blow moulded into a container. Preform 270 includes a flange 272, a substantially hollow interior 274 and a preform opening 276. Preferably the preform 270 is made from PET or some other thermoplastic, for example, a polyvinyl chloride, a styrene, an acrylic or a polyolefin.

To aid the stretch blow moulding of preform 270 a suitable heater (not depicted) is used to heat the preform 270. For example, if the preform 270 is made from PET, the temperature to which the preform 270 is heated is the stretching temperature of PET which is usually in the range of about 85° C. to 130° C. and preferably about 105° C. A person of skill in the art is readily able to select appropriate temperatures for which to heat other plastics.

Apparatus 100 does not comprise a heater and therefore preform 270 has been heated before being positioned on apparatus 100. In another embodiment the preform 270 is heated while or after being positioned on the apparatus 100. It is understood the purpose of heating preform 270 is so that it will be able to be stretched and expanded as required for moulding. In embodiments wherein preform 270 does not require heating for stretching and expansion, for example, a preform 270 that is rendered compliant for moulding by a non-thermal chemical process, the preform 270 does not require heating.

Preferably the preform 270 is heated before being positioned on apparatus 100 by submersion in liquid heated to between about 85° C. and 130° C. for about five minutes. Most preferably the liquid is heated to about 105° C. This form of heating is a preferable because the heat penetrates to the middle of the walls of preform 270, heating the preform 270 uniformly. Radiative heating as taught in the prior art superheats the surface of preform 270 may induce crystallinity. While the advantages of heating by submersion in liquid have been discussed above this is a preferable form only, a person of skill in the art is readily able to select a suitable method of heating preform 270, such as, radiative heating.

In FIG. 2, as compared to FIG. 1, mould half 114 is engaged with mould half 116 to form a continuous mould cavity 218 and a mould opening 219 which leads to the mould cavity 218. The shape of the mould cavity 218 corresponds to the shape of the container which is able to be formed by the apparatus 100.

The mould halves 114, 116 are secured together by the lock 120 which is secured in the locked position with pin 224.

The dimensions of both the cavity 218 and the opening 219 are such that substantially hollow preform 270 can be inserted into the cavity 218 through the opening 219.

The preform 270 is positioned within cavity 218 by inserting it through the mould opening 219 and located to partly extend into mould cavity 218. In the orientation shown in FIG. 2 outwardly projecting flange 272 limits the extent to which the preform 270 is able to be inserted into the cavity 218 and flange 272 surrounds opening 276 of the preform 270.

FIG. 2 also shows the peripheral hydraulic rams 140 have moved the sealing member 142 into position to form a seal between preform 270 and sealing member 142. First seal 144 forms a seal between the upper surface of sealing member 142 and the preform 270, including between the gas line 152 and the hollow interior 274 and between the incompressible fluid line 162 and the hollow interior 274. Second seal 146 forms a seal between stretching member 132 and gap 133.

The peripheral hydraulic rams 140 press the sealing member 142 against the flange 272 so the preform 270 is inserted as far as possible into the cavity 218 and so that a secure seal is formed between the flange 272, the sealing member 142 and the hollow interior 274. The seals formed prevent fluid in the hollow interior 274 from exiting the preform 270 in any manner apart from controlled exit through the gas line 152 or incompressible fluid line 162.

Referring again to FIG. 2 it can be seen the incompressible fluid line 162 extends through sealing member 142 such that when the preform 270 is positioned and sealed with sealing member 142 incompressible fluid may exit the incompressible fluid line 162 and enter the hollow interior 274 of the preform 270.

The hollow interior 274 is connected to incompressible fluid pump 166 by incompressible fluid line 162 which extends through the sealing member 142 so that the incompressible fluid pump 166 is able to pump an incompressible fluid, such as water, stored in incompressible fluid tank 164 into the hollow interior 274. As described below the incompressible fluid may also be drained from the hollow interior 274 through the incompressible fluid line 162.

Figure 3:
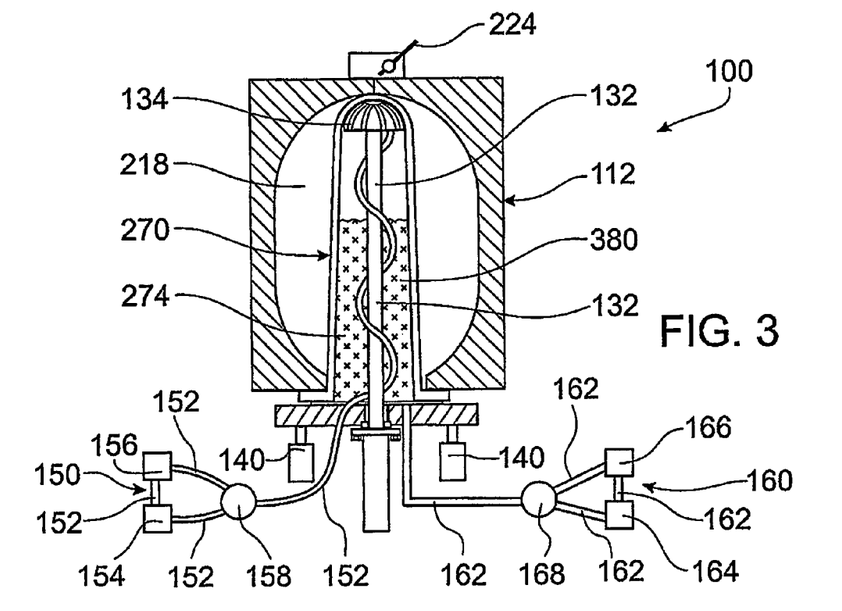
FIG. 3 provides a schematic depiction of a stretch blow moulding apparatus of the invention in which the stretching member is extended and incompressible fluid partly fills the preform.

FIG. 3 shows the stretching member 132 having moved from the retracted position in FIG. 2 to the extended position with the mushroom head 134 having made contact with the preform 270. It is appreciated from FIG. 2 and FIG. 3 that as the stretching member 132 moves from the retracted position to the extended position it stretches the preform 270 longitudinally. When the stretching member 132 is in the extended position part of the preform 270 contacts, or nearly contacts, the interior surface of mould 112. By nearly contacts is meant the preform 270 is within a prescribed distance from the interior surface of mould 112. A person of skill in the art is readily able to select the prescribed distance. For example, the prescribed distance may be 1 mm, 2 mm, 3 mm, 4 mm, 5 mm, 10 mm, 15 mm, 20 mm, 25 mm, 50 mm.

The stretching member 132 may be moved axially back and forth through the sealing member 142 such that it moves in a longitudinal direction within the preform 270 and the cavity 218 of the mould 112.

Returning to FIG. 3 the heated preform 270 is expanded inside the cavity 218 by the pumping of water 380 into the hollow interior 274 so that the preform 270 is filled with water 380 at the required blowing pressure. The water 380 is pumped from incompressible fluid tank 164 through incompressible fluid line 162 by incompressible fluid pump 166. The direction of flow is controlled by incompressible fluid valve 168. As shown in FIG. 3 the water 380 fills the perform 270 from the bottom to the top.

During the process of filling the hollow interior 274 with water 380 the incompressible fluid valve 168 is open to the incompressible fluid pump 166 which pumps water 380 from incompressible fluid tank 164 into hollow interior 274 while gas valve 158 is open to the gas supply 154 and closed to the gas compressor 156. In apparatus 100 the gas is air and the gas supply 154 is the atmosphere. In other embodiments the gas may be non-atmospheric gas and gas supply 154 will be a source of the non-atmospheric gas stored in, for example, a tank.

Any air, or other gas, trapped above the water 380 is forced through the plurality of gas channels 136 into gas line 152 and when the air, or other gas, is detected in the gas line 152 the gas valve 158 is shut to the gas compressor 156 and open to the gas supply 154. This allows the trapped air, or other gas, to exit to the gas supply 154. This step advantageously removes the dangerous safety issue presented by a large volume of pressurized air or other gas.

Preferably the incompressible fluid is heated which advantageously prevents the preform 270 from cooling during expansion. When the preform 270 is comprised of PET the incompressible fluid is typically heated to between about 85° C. and 130° C., and preferably to about 95° C. A person of skill in the art is readily able to select an appropriate temperature to which to heat the incompressible fluid.

If the preform 270 is comprised of PET the blowing pressure of the incompressible fluid will typically be between about 3 and 40 bar and will preferably be about 20 bar. A person of skill in the art is readily able to select an appropriate blowing pressure for PET or any other plastic.

In FIG. 3 water 380 is shown to have partially filled the hollow interior 274. The incompressible fluid pump 166 will continue to pump water 380 into interior 274 to expand the preform 270 to contact the inner surface of the mould 112.

Figure 4:
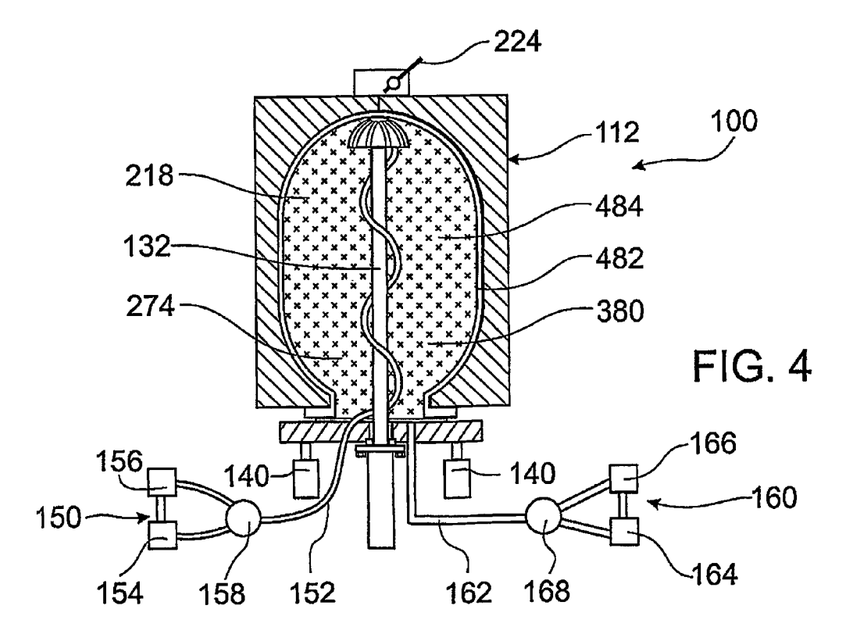
FIG. 4 provides a schematic depiction of a stretch blow moulding apparatus of the invention in which incompressible fluid has expanded the stretched preform to the shape of the mould.

FIG. 4 shows the apparatus 100 in which the water 380 has been pumped into the hollow interior 274 at the blow pressure, causing the preform 270 to have expanded to press against the interior surface of the mould 112 so that the expanded preform 270 adopts the shape of the cavity 218.

When the hollow interior 274 is full of water 380 and all the air, or other gas, has been bled from the hollow interior 274, as shown in FIG. 4, the gas valve 158 is closed to both the gas supply 154 and gas compressor 156.

It is to be understood that when the expanded stretched heated preform 270 is expanded to an extent that the exterior surfaces of the preform 270 press against the interior surface of the mould the article has been formed. Therefore, in this specification and claims the terms expanded stretched heated preform 270 and article or container may be used interchangeably.

In FIG. 4 the preform 270 has been heated, stretched and expanded to such an extent that it has taken on the shape of the mould. The preform 270 is now in the form of container 482 which has a container interior 484.

Figure 5:
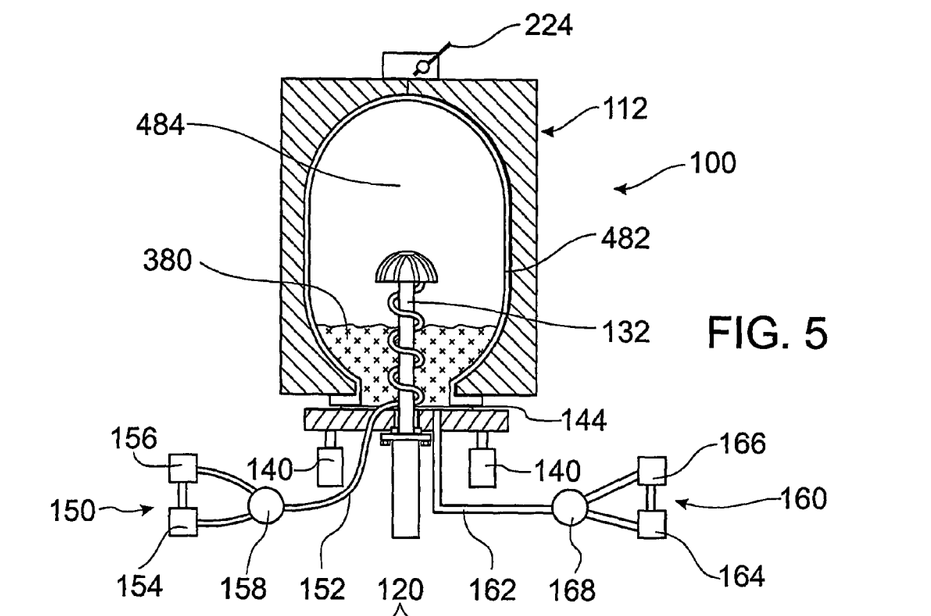
FIG. 5 provides a schematic depiction of a stretch blow moulding apparatus of the invention in which incompressible fluid is partly drained from the formed container.

Referring now to FIG. 5 the stretching member 132 has been retracted and water 380 is being drained from the hollow container interior 484. To drain the water 380 the incompressible fluid valve 168 is open to incompressible fluid tank 164 so the water 380 will travel along the incompressible fluid line 162 to return to the incompressible fluid tank 164.

To assist the draining of the water 380 the gas valve 158 is open to the gas compressor 156 which pumps gas into container interior 484 and maintains the pressure inside the container interior 484 sufficient to hold the container 482 in the shape of mould 112.

Preferably the gas is at a temperature which cools the container 482 which advantageously aids the formation of an evenly expanded container 482 and prevents the container 482 from collapsing. The gas is typically maintained at between about 5° C. and 85° C. Preferably the gas is used at ambient temperature and no temperature maintenance is necessary. A person of skill in the art is readily able to select an appropriate temperature at which to maintain the gas.

The pressure of the incompressible fluid is decreased during extraction to be typically between about 3 and 40 bar and preferably to be about 6 bar if the preform 270 is made from PET. A person of skill in the art is readily able to select an appropriate blowing pressure for PET or any other plastic.

The pressure of the gas introduced into the container interior 484 will typically be between 3 and 40 bar and will preferably be 7 bar if the preform 270 is made from PET. A person of skill in the art is readily able to select an appropriate blowing pressure for PET or any other plastic.

As explained above the cavity 218 corresponds to the shape of the container such that container 482 having a container interior 484 is formed. Once the container 482 has cooled sufficiently, the container 482 will stably maintain in the shape of the mould 112 without requiring the presence of gas or incompressible fluid.

Once the container 482 has cooled sufficiently so that it will maintain its shape without requiring the presence of gas or water, and once all water 380 has emptied from container interior 484, the gas valve 158 is closed to the gas compressor 156 and open to the gas supply 154 and gas is drained from the hollow interior through gas line 152 into gas supply 154. The container 482 is then removed from the mould 112.

Figure 6:
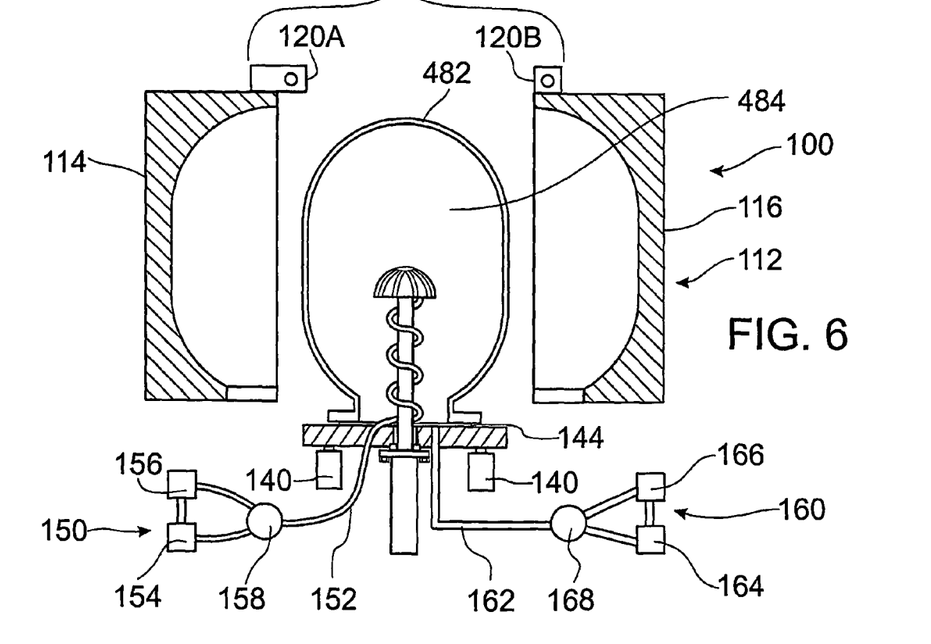
FIG. 6 provides a schematic depiction of a stretch blow moulding apparatus of the invention in which a formed container is ready for removal from the apparatus.

FIG. 6 shows the apparatus 100 in which the lock 120 has been released, the two mould halves 114, 116 have been disengaged and the seal 144 has been released so that container 482 may be removed from mould 112.

For ease of description the embodiment described above includes the step of filling the container with gas. This step is optional. The method and apparatus of the invention are operable without filling the container with gas.

The invention has been described above with reference to water 380 and air. However any incompressible fluid may be used in place of water and any gas may be used in place of air.

Figure 7:
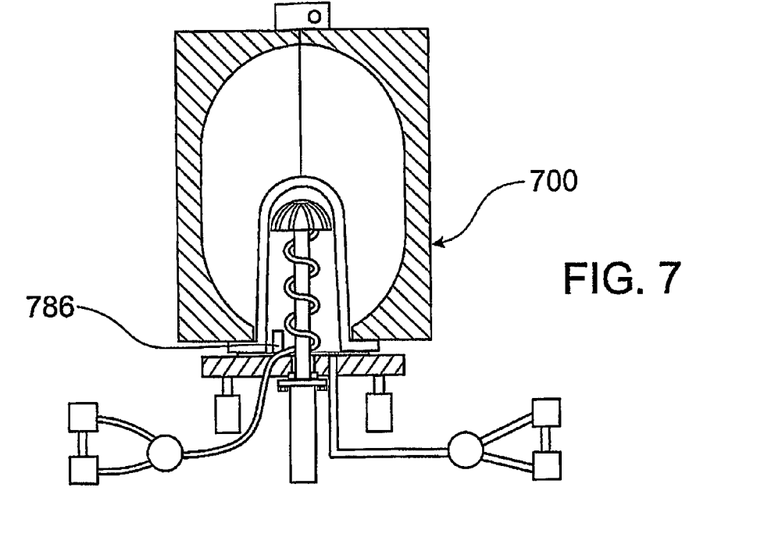
FIG. 7 provides a schematic depiction of a stretch blow moulding apparatus of the invention comprising a heater.

FIG. 7 shows a second embodiment of the invention in which apparatus 700 comprises a heater 786 for heating the preform 270.

The apparatus 100 and 700 above have been described with reference to the gas line 152 and incompressible fluid line 162 having separate entrances into the hollow interior 274. In another embodiment the gas line 152 and incompressible fluid line 162 communicate with the hollow interior 274 through a same opening.

The stretching rod 132 need not have a mushroom head 134 and may have any shaped head. For example a rounded head, a square head and a conical head.

The inventors have found best results are achieved with a plurality of gas channels 136. It is understood the invention may be used with only one gas channel 136.

Any number of peripheral hydraulic rams 140 may be used in the present invention. It is to be understood for even movement it is desirable to place the peripheral hydraulic rams 140 symmetrically about central hydraulic ram 138.

In the embodiment described above the air line 152 is shown completely external to the stretching rod 132. This need not be the case and part or all of the air line 152 extending into mould 112 may be housed within the stretching rod 132.

Figure 8:
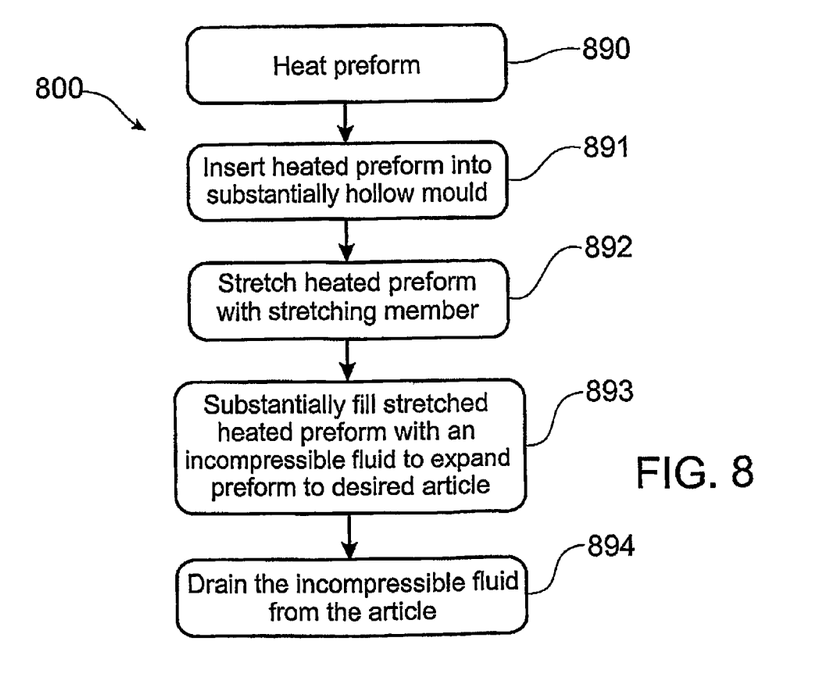
FIG. 8 provides a flowchart illustrating preferred steps of the method of the invention.

FIG. 8 shows a method according to one embodiment of the invention in which at step 890 a preform is heated.

At step 891 the heated preform is inserted in a substantially hollow mould.

At step 892 the heated preform is stretched with a stretching member.

At step 893 the stretched heated preform is substantially filled with an incompressible fluid to expand the preform to the desired article.

Finally at step 894 the incompressible fluid is drained from the article.

A person of skill in the art readily understands which steps of the method 800 may be varied in order without adversely affecting the objectives of the invention. For example, step 890 may be performed after or before step 891, or they may be performed concurrently.

The apparatus 100, 700 and method 800 may be used to mould any suitable article of any suitable size and shape. For example, a container, such as a container having a symmetrical shape may be manufactured. As shown in FIGS. 1-7 the mould may have a simple shape with an opening in one of the ends. Shapes such as a tank or a water tank may be manufactured.

Although the apparatus 100, 700 and method 800 are particularly suitable for manufacturing articles which have volumes and wall thicknesses which respectively exceed 20 liters and 0.3 millimetres, they may nevertheless be used to manufacture containers of volume 20 liters or less and having wall thicknesses of 0.3 millimetres or less.

The apparatus 100, 700 and method 800 may be used to mould an article from a preform 270 which is made from any suitable plastic. Preferably, the preform 270 is substantially made from a thermoplastic, for example PET.

The heater which is used to heat the preform 270 may be of any suitable type. Preferably, the heater is able to be operated to heat the preform 270 to any temperature which will allow the preform 270 to be moulded into the shape of the article. In a more preferred aspect, the heater is able to be operated to heat the preform 270 to the stretching temperature of the plastic from which the preform 270 is comprised. If the preform 270 is comprised from PET, the heater is preferably operated to heat the preform 270 to the stretching temperature of PET which is typically in the range of about 85° C. to 130° C. More preferably the heater is operated to heat the preform to about 105° C.

The mould 112 may be of any suitable type. A person of skill in the art is readily able to select a suitable mould and suitable mould shape based on the article to be manufactured.

So that the invention may be fully understood and put into practical effect, the invention is described with reference to the following non-limiting example.

Example

Using the method and apparatus of the invention a preform of length 1200 mm, diameter 600 mm and weighing 25 kg with 8 mm thick walls was stretched to form a water tank of 1000 liter volume with 2.5 mm thick walls.

The formed rain water tank was uniformly expanded and produced in a relatively short period of time of 5 minutes, which is much shorter than the one hour required to form a 1000 liter tank by rotational moulding.

The formed rain water tank was comprised of PET and looked visually superior to rain water tanks made from other plastics and unlike tanks made from other plastics was readily able to be painted, powder coated and shaped.

Advantageously, the stretch blow moulding method and apparatus of the invention allows the production of plastic articles and containers having relatively large volumes and wall thickness, for example a volume and wall thickness which respectively exceed 20 liters and 0.3 mm. For example, articles with volumes of 25, 30, 35, 50, 100, 150, 200, 250, 500, 600, 700, 800, 900, 1000, 1250, 1500, 2000, 3000, 4000 and 5000 liters may be manufactured using the apparatus 100, 700 and method 800 of the invention. The production of such large PET articles and containers has not been possible prior to the invention.

In particular, the stretch blow moulding method and apparatus of the invention provides a simple device and method for the manufacture of large plastic articles and containers of volume greater than 20 liters, e.g. pool filter housings and water tanks, from PET. Prior to the present invention the manufacture of such large plastic articles containers was not possible from PET. Prior to the invention manufacture of large plastic containers and articles was dependent on rotational moulding with liner low density polyethylene (LLDPE).

The invention has made it possible to stretch blow mould large articles and containers out of PET which is about ten times stronger than LLDPE. Additionally, articles and containers manufactured from PET may be painted, powder coated and shaped; none of this is possible with LLDPE or any other prior art method or apparatus. Additionally, PET articles and containers are visually more attractive than LLDPE articles and containers.

A further advantage of the present invention is the use of an incompressible fluid in the present invention overcomes the safety issues that arise when using a gas such as air. Hot pressurized air of large volume such as would be used to stretch blow mould articles with volume of 20 liters or greater by conventional methods present serious safety issues.

The inventors novel and inventive use of a incompressible fluid and a stretching rod advantageously enables the manufacture of large plastic articles, such as articles having a volume of 20 liters. Without this novel and inventive method and apparatus the final article or container will expand unevenly and will have a thick and thin side.

A further advantage of the invention is that it makes possible more rapid production of large plastic articles than prior art methods. This increase in speed of production increases efficiency and profitability of manufacture.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All patent and scientific literature referred to herein is incorporated herein by reference.

The invention claimed is:

1. A method for moulding a substantially hollow plastic article from a substantially hollow heated plastic preform, the method including:
    inserting the heated preform into a substantially hollow mould;
    stretching the heated preform with a stretching member;
    substantially filling the stretched heated preform with an incompressible fluid such that the stretched heated preform expands and is formed into the shape of the article by the mould; and
    substantially filling the article with a gas to displace the incompressible fluid from the article and to cool the article.

2. The method of claim 1 wherein the article is a container.

3. The method of claim 2 wherein the container is a tank.

4. The method of claim 2 wherein the container is a water tank.

5. The method of claim 2 wherein the container has a volume greater than 20 liters and a wall thickness greater than 0.3 millimeters.

6. The method of claim 1 wherein the gas cools the article and sets the article in final shape.

7. A method for moulding a substantially hollow plastic article from a substantially hollow plastic preform, the method including:
    inserting the preform into a substantially hollow mould;
    heating the preform;
    stretching the heated preform with a stretching member;
    substantially filling the stretched heated preform with an incompressible fluid such that the stretched heated preform expands and is formed into the shape of the article by the mould; and
    substantially filling the article with a gas to displace the incompressible fluid from the article and to cool the article.

8. The method of claim 7 wherein the article is a container.

9. The method of claim 8 wherein the container is a tank.

10. The method of claim 8 wherein the container is a water tank.

11. The method of claim 8 wherein the container has a volume greater than 20 liters and a wall thickness greater than 0.3 millimeters.

12. The method of claim 7 wherein the gas cools the article and sets the article in final shape.

13. An apparatus for moulding a substantially hollow plastic article from a substantially hollow plastic preform, the apparatus comprising:
    a substantially hollow mould for receiving the preform;
    a stretching member for stretching the preform after heating of the preform;
    an incompressible fluid filler for substantially filling the stretched heated preform with an incompressible fluid such that the preform expands;
    a gas filler for substantially filling the article formed by expanding the stretched heated preform with a gas such that the incompressible fluid is displaced and the article cooled by the gas; and
    a drain for draining the incompressible fluid from the interior of the article.

14. The apparatus of claim 13 further comprises a heater for heating the preform.

15. The apparatus of claim 13 wherein the mould is for a container.

16. The apparatus of claim 13 wherein the mould is for a tank.

17. The apparatus of claim 13 wherein the mould is for a water tank.

18. The apparatus of claim 13 wherein the mould has a volume greater than 20 liters and a wall thickness greater than 0.3 millimeters.

19. The apparatus of claim 13 wherein a sealing member covers an opening of the preform.

* * * * *